United States Patent
Riedy et al.

(10) Patent No.: US 6,739,629 B2
(45) Date of Patent: May 25, 2004

(54) BELL AND SPIGOT JOINT WITH LOCKING STRAP

(75) Inventors: Charles H. Riedy, Lakewood, OH (US); Dennis P. Revlock, Sr., Medina, OH (US)

(73) Assignee: The Lamson & Sessions Co., Cleveland, OH (US)

( * ) Notice: Subject to any disclaimer, the term of this patent is extended or adjusted under 35 U.S.C. 154(b) by 0 days.

(21) Appl. No.: 10/176,323

(22) Filed: Jun. 20, 2002

(65) Prior Publication Data
US 2003/0234536 A1 Dec. 25, 2003

(51) Int. Cl.$^7$ ................................. F16L 37/00
(52) U.S. Cl. ........................ 285/305; 285/321
(58) Field of Search ................. 285/305, 321, 285/330, 913

(56) References Cited

U.S. PATENT DOCUMENTS

| | | | | |
|---|---|---|---|---|
| 2,013,660 A | * | 9/1935 | Lauer | 285/305 |
| 2,403,368 A | * | 7/1946 | Howard | 285/37 |
| 2,597,482 A | | 5/1952 | Harrison et al. | |
| 2,839,218 A | | 6/1958 | Zerbe | |
| 2,969,994 A | * | 1/1961 | Jacobs et al. | 285/34 |
| 3,181,897 A | | 5/1965 | Krayenbuhl et al. | |
| 3,239,244 A | * | 3/1966 | Leinfelt | 285/7 |
| 3,334,929 A | | 8/1967 | Wiltse | |
| 3,422,630 A | | 1/1969 | Marier | |
| 3,606,402 A | | 9/1971 | Medney | |
| 3,759,553 A | | 9/1973 | Carter | |
| 3,759,554 A | | 9/1973 | Carter | |
| 4,247,147 A | * | 1/1981 | Rettkowski | 299/10 |
| 4,269,436 A | | 5/1981 | Medney | |
| 4,281,601 A | * | 8/1981 | Overman | 102/276 |
| 4,293,148 A | * | 10/1981 | Milberger | 285/90 |
| 4,396,210 A | | 8/1983 | Spencer, III et al. | |
| 4,408,383 A | * | 10/1983 | Nottingham et al. | 29/453 |
| 4,427,221 A | | 1/1984 | Shay, Jr. | |
| 4,498,874 A | * | 2/1985 | Pichl | 440/83 |
| 4,679,825 A | | 7/1987 | Taylor | |
| 4,697,947 A | | 10/1987 | Bauer et al. | |
| 4,749,192 A | * | 6/1988 | Howeth | 285/86 |
| 4,798,406 A | * | 1/1989 | Buller | 285/320 |
| 4,886,121 A | * | 12/1989 | Demny et al. | 166/382 |
| 4,927,192 A | | 5/1990 | Ungchusri et al. | |
| 5,052,404 A | | 10/1991 | Hodgson | |
| 5,083,820 A | | 1/1992 | Hopperdietzel | |
| 5,165,832 A | | 11/1992 | Dimov | |
| 5,178,216 A | | 1/1993 | Giroux et al. | |
| 5,255,945 A | | 10/1993 | Toon | |
| 5,498,042 A | * | 3/1996 | Dole | 285/148.27 |
| 5,509,699 A | | 4/1996 | Himmelberger | |
| 5,573,279 A | | 11/1996 | Rea et al. | |
| 5,813,705 A | | 9/1998 | Dole | |
| 5,868,443 A | | 2/1999 | Ungerman et al. | |
| 6,086,297 A | | 7/2000 | Lotfi | |
| 6,179,347 B1 | * | 1/2001 | Dole et al. | 285/321 |
| 6,325,424 B1 | | 12/2001 | Metcalfe et al. | |
| 6,343,813 B1 | * | 2/2002 | Olson et al. | 285/305 |

FOREIGN PATENT DOCUMENTS

| | | |
|---|---|---|
| AU | 225666 | 4/1959 |
| FR | 1310712 | 10/1961 |
| FR | 1397378 | 3/1964 |
| WO | WO 99/40355 | 8/1999 |

* cited by examiner

*Primary Examiner*—David Bochna
(74) *Attorney, Agent, or Firm*—Jones Day

(57) ABSTRACT

Aligned circumferential grooves between a bell and spigot form a passage for receiving a locking strap that is insertable into the passage through an entrance opening in the wall of the bell. The locking strap has at least one projection adjacent the tail end portion thereof for engaging a surface of the passage to resist withdrawal of the locking strap from the passage. The entrance opening and the tail end portion of the locking strap have cooperating abutment and shoulder surfaces to releasably lock the strap within the passage.

19 Claims, 7 Drawing Sheets

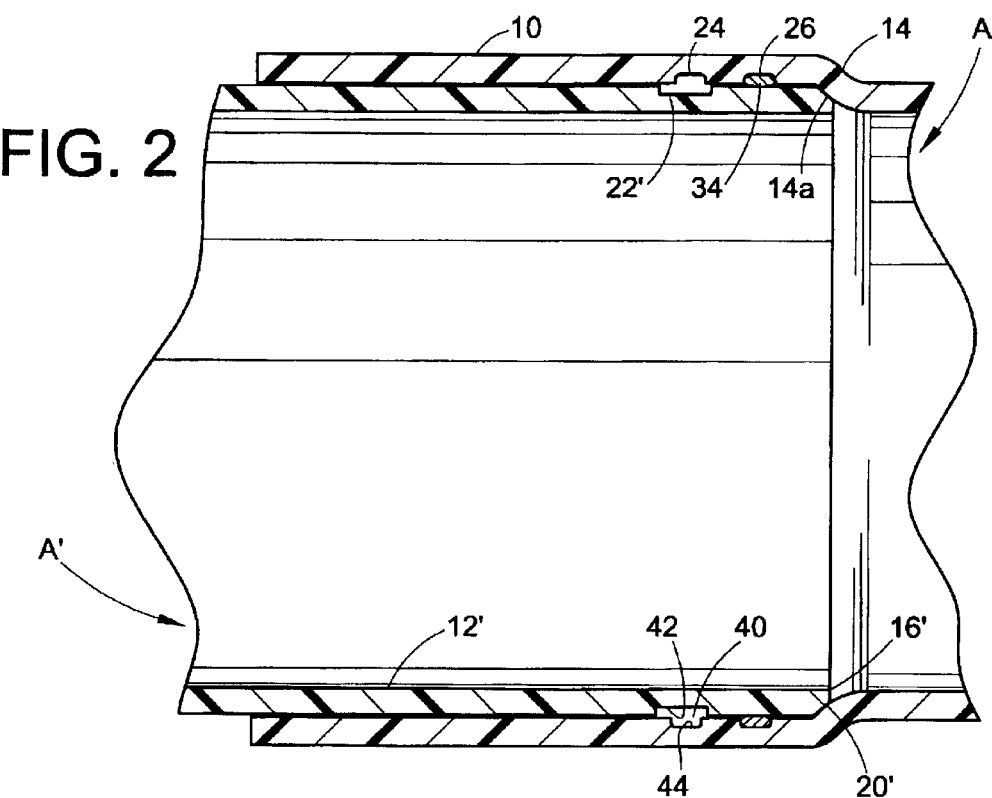
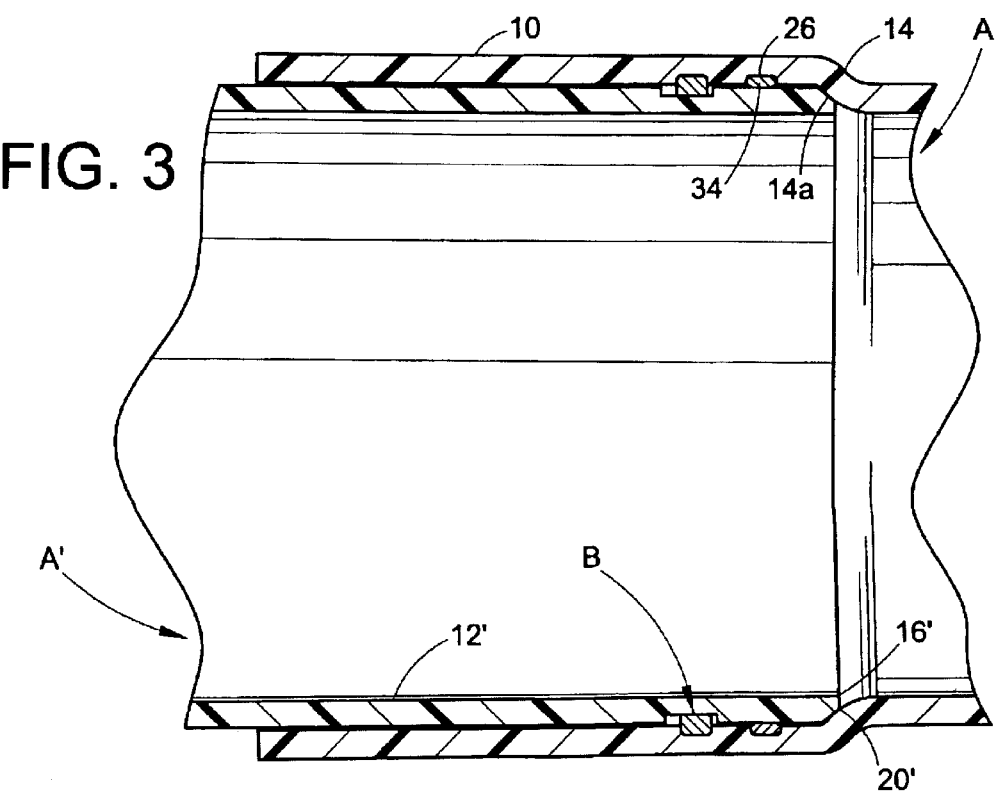

BELL AND SPIGOT JOINT WITH LOCKING STRAP

BACKGROUND OF THE INVENTION

This application relates to the art of conduit joints and, more particularly, to conduit joints that include a locking strap for preventing separation of the joint. The invention is particularly applicable to bell and spigot joints between end portions of cylindrical pipe and will be described with specific reference thereto. However, it will be appreciated that certain features of the invention have broader aspects and can be used in other types of joints.

A common locking strap joint between a bell and spigot includes axially aligned circumferential grooves that form a circumferential locking strap passage between the inwardly facing cylindrical surface of the bell groove and the outwardly facing cylindrical surface of the spigot groove for receiving a locking strap which is inserted into the passage through an entrance opening in the wall of the bell. During handling and installation of the pipe, the locking strap may become dislodged from its position within the aligned grooves between the bell and spigot by withdrawal thereof through the entrance opening in the wall of the bell. This may result in separation of the joint if the locking strap is completely displaced or may significantly weaken the strength of the joint if the locking strap is partially displaced.

It would be desirable to have an efficient arrangement for minimizing the possibility of unintentional locking strap withdrawal once it has been fully inserted into the passage formed by the aligned circumferential grooves between the bell and spigot.

SUMMARY OF THE INVENTION

A joint of the type described includes a locking strap having at least one projection that frictionally engages a surface of the locking strap passage for resisting withdrawal of the locking strap from the passage.

In accordance with another aspect of the application, an entrance opening in the wall of the bell to the locking strap passage includes an abutment that is engageable by a locking strap shoulder when the locking strap is fully inserted into the locking strap passage. Engagement between the abutment and shoulder prevents unintentional withdrawal of the locking strap from the locking strap passage through the entrance opening.

In accordance with the present application, a bell and spigot joint includes an outer circumferential spigot groove axially aligned with an inner circumferential bell groove. The aligned grooves provide a locking strap passage for receiving a circumferentially-split generally circular locking strap that is insertable into the passage through a passage entrance opening in the wall of the bell.

In a preferred arrangement, the projection on the locking strap is a crushable rib that provides high frictional interference between the locking strap and a surface of the passage in which it is received.

In one arrangement, the crushable rib extends longitudinally of the locking strap adjacent the tail end thereof and is centered between the locking strap sides. In another arrangement, there are two spaced-apart transverse projection ribs on the outer locking strap surface and a single projection rib on the inner locking strap surface at a location intermediate the two ribs. With this arrangement, the locking strap itself is deformed on the opposite side thereof from the ribs into firm engagement with the inner and outer surfaces of the locking strap passage.

In accordance with another aspect of the application, the entrance opening to the locking strap passage in the wall of the bell includes an abutment engageable by a shoulder on the tail end portion of the locking strap once the locking strap is fully inserted into the locking strap passage. Engagement between the abutment and the shoulder prevents unintentional separation of the locking strap from the locking strap passage. The tail end portion of the locking strap may be outwardly displaced to separate the shoulder from the abutment for allowing withdrawal of the locking strap from the locking strap passage.

The shoulder may be on a trailing surface of a barb that projects from the underside of the locking strap. A cam surface on the opposite side of the locking strap from the barb cooperates with an upper edge of the entrance opening in the wall of the bell to hold the barb shoulder in engagement with the abutment.

It is a principal object of the present invention to provide an improved bell and spigot locking strap joint.

It is another object of the invention to provide an improved locking strap for use with bell and spigot locking strap joints.

It is a further object of the invention to provide improved arrangements for inhibiting withdrawal of a locking strap from a locking strap passage in a bell and spigot locking strap joint.

BRIEF DESCRIPTION OF THE DRAWING

FIG. 2 is a cross-sectional elevational view of a bell and spigot joint without a locking strap;

FIG. 3 is a cross-sectional view similar to FIG. 2 with the locking strap added;

DESCRIPTION OF PREFERRED EMBODIMENTS

Figure 1:
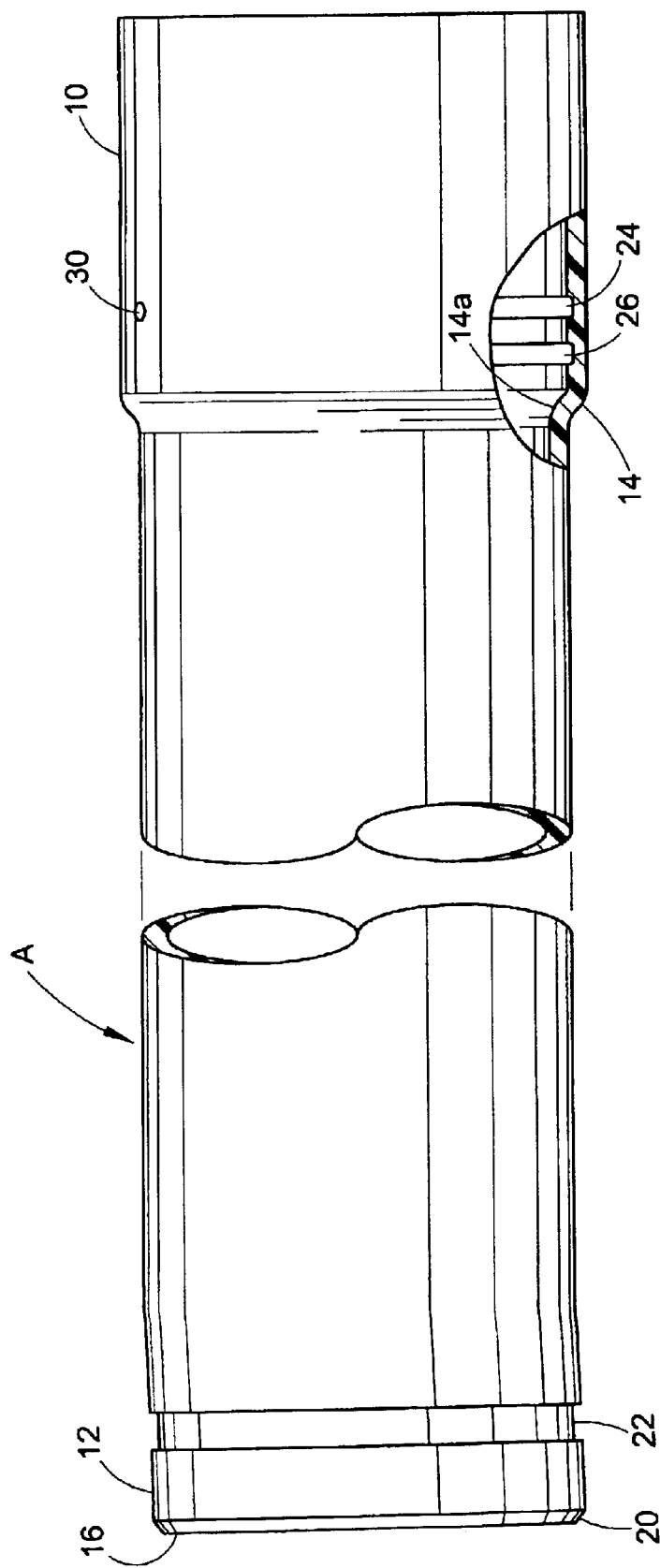
FIG. 1 is a side elevational view of a cylindrical pipe with portions cut-away and in section for clarity of illustration.

Referring now to the drawing, wherein the showings are for purposes of illustrating certain representative embodiments of the invention only and not for purposes of limiting same, FIG. 1 shows a cylindrical pipe A having a bell 10 on one end portion thereof and a spigot 12 on the opposite end portion thereof.

Pipe A has an outwardly expanded transition portion as generally indicated at 14 to provide bell 10 with inner and outer diameters that are greater than the inner and outer diameters of pipe A. The inner cylindrical diameter of bell 10 is dimensioned for closely receiving the outer cylindrical diameter of spigot 12 therein. An outwardly inclined internal surface 14a at the start of bell 10 defines a stop that is engaged by spigot end 16 when spigot 12 is fully received in bell 10.

Spigot 12 has an inwardly inclined external chamfer 20 adjacent end 16 thereof, and an outer circumferential locking strap groove 22 spaced from spigot end 16. Bell 10 has an inner circumferential locking strap groove 24 and an inner circumferential sealing ring groove 26 axially spaced therefrom. A transverse entrance opening 30 through the wall of bell 10 is axially aligned tangentially with locking strap groove 24 for permitting insertion of a locking strap therethrough.

The axial spacing from spigot end 16 to spigot locking strap groove 22, and the distance from stop surface 14a to bell locking strap groove 24, are such that the centerlines of grooves 22 and 24 are axially aligned with one another when spigot end 16 is in engagement with stop surface 14a.

FIGS. 2 and 3 show a joint between a bell and spigot on adjacent pipes. In these figures, the features of the pipe having the spigot thereon are identified by the same numbers as used in FIG. 1 with the addition of a prime. An elastomeric sealing ring 34 is positioned within sealing ring groove 26 in bell 10 prior to insertion of a spigot into the bell. Chamfered surface 20' on spigot 12' facilitates movement of the spigot end past the sealing ring until spigot end 16' engages stop surface 14a. Sealing ring 34 then seals against the outer cylindrical surface of the spigot between spigot locking strap groove 22 and chamfer 20.

The axial width of spigot locking strap groove 22' is greater than the axial width of bell locking strap groove 24 to accommodate some misalignment therebetween and minimize the need to maintain very close tolerances. Locking strap grooves 22', 24 together form a circumferential locking strap passage 40 having inner and outer locking strap passage surfaces 42, 44.

Figure 4:
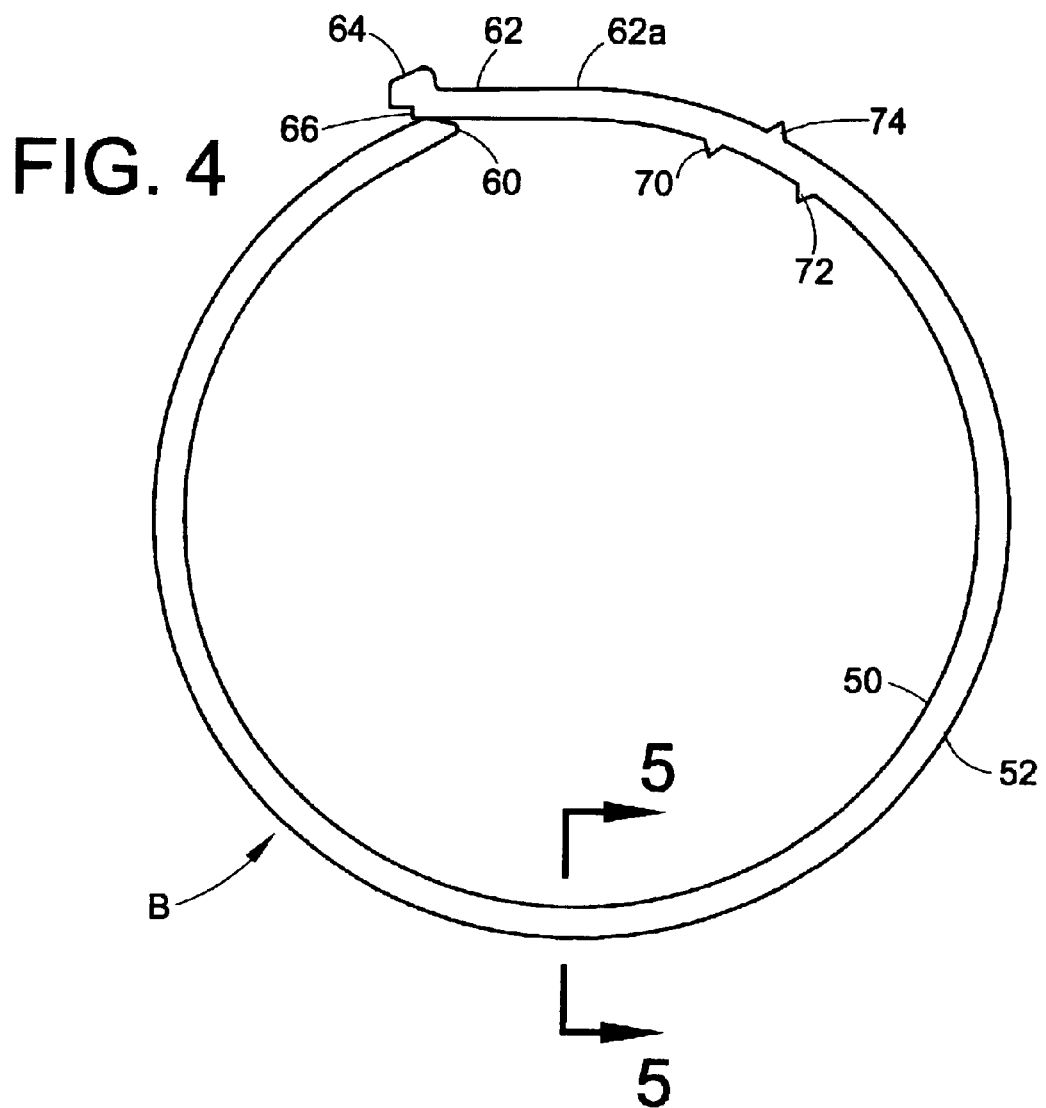
FIG. 4 is a side elevational view of one embodiment a locking strap in accordance with the present application.
Figure 5:
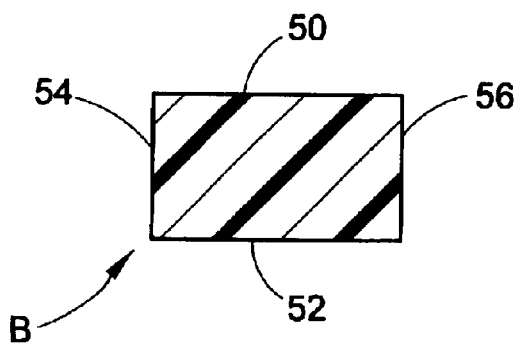
FIG. 5 if a cross-sectional elevational view taken generally on line 5—5 of FIG. 4.
Figure 6:
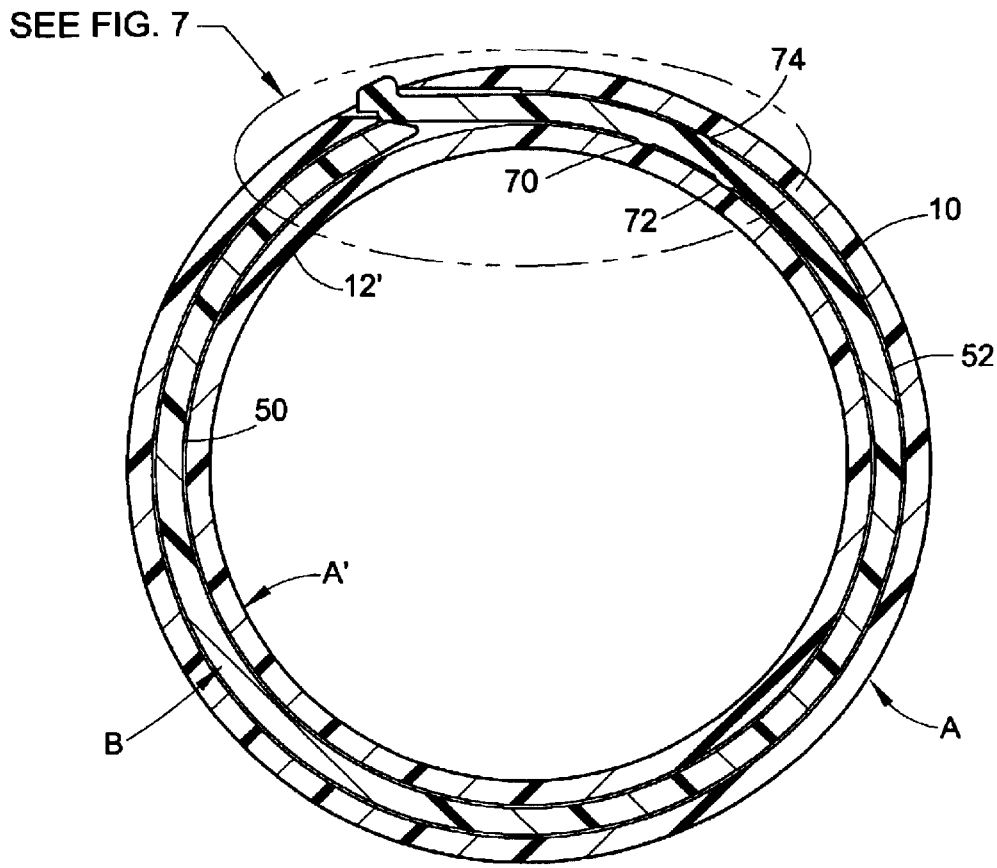
FIG. 6 is a cross-sectional elevational view of a bell and spigot joint having the locking strap of FIG. 4 therein.

Circumferentially split circular locking strap B of FIG. 4 has inner and outer surfaces 50, 52 and opposite sides 54, 56. Locking strap B includes a tapered tip 60 and a tail portion 62 with an enlarged head 64. The locking strap is molded of plastic material in a generally circular configuration as shown so that the strap is a ring having a shape that generally corresponds to the shape of the passage in which it is received. Tail portion 62 is straight rather than being curved over 20–40° of the total 360° circumference of the locking strap. A locking strap shoulder 66 is provided on locking strap B beneath head 64 for engaging an abutment 30b within passage entrance opening 30 in bell 10.

A plurality of transverse projections are provided on inner and outer surfaces 50, 52 of locking strap B. In the arrangement illustrated in FIG. 4, a pair of spaced-apart projections 70, 72 extend inwardly from locking strap inner surface 50 and a single transverse projection 74 extends outwardly from locking strap outer surface 52. Outer projection 74 is located intermediate inner projections 70, 72, and preferably is located midway between the inner projections. Each projection has the general shape of an isosceles triangle as viewed from the side of the locking strap and extends completely across locking strap surfaces 50, 52 between opposite sides 54, 56 thereof.

With a bell and spigot assembled as shown in FIG. 2, a locking strap is opened up to begin insertion of tip 60 into opening 30 in bell 10. The locking strap is pushed into locking strap passage 40 until projection 72 engages locking strap passage inner surface 42. A mallet or other suitable tool then may be used to hammer on locking strap head 64 to drive the locking strap completely into the locking ring passage against the resistance provided by engagement between projections 70, 72 and 74 and the inner and outer passage walls.

Figure 7:
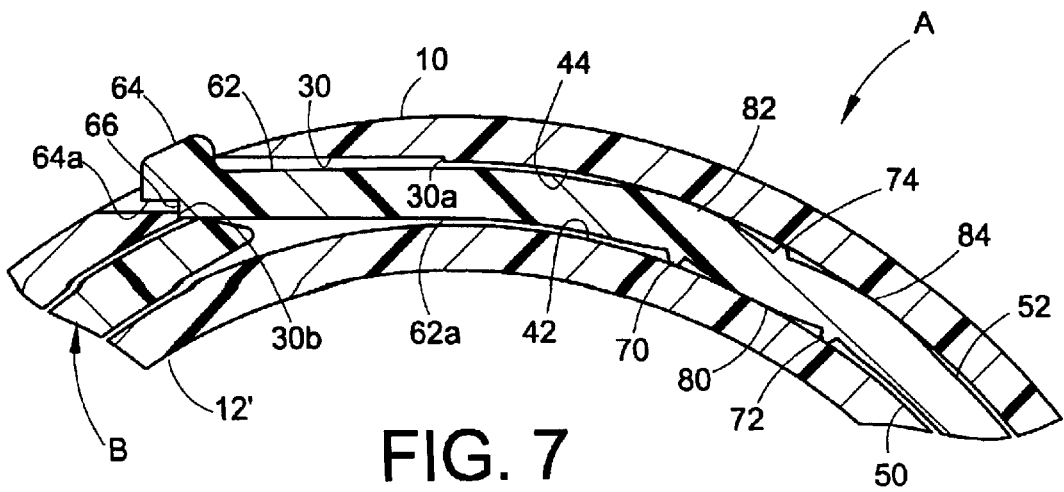
FIG. 7 is an enlarged partial cross-sectional view similar to FIG. 6 showing the tail end portion of the locking strap received in a locking strap passage.

As shown in FIG. 7, locking strap B deforms intermediate inner projections 70, 72 into engagement with locking strap passage inner surface 42 as generally indicated at 80 in FIG. 7. In addition, locking strap B deforms outwardly as generally indicated at 82, 84 into engagement with locking strap passage outer surface 44. Thus, the locking strap deforms opposite from projections 70, 72 and 74 into engagement with the inner and outer surfaces of the locking strap passage. The apex of each triangular projection 70, 72, 74 also is flattened out by being crushed as the strap is forced into the passage.

Figure 8:
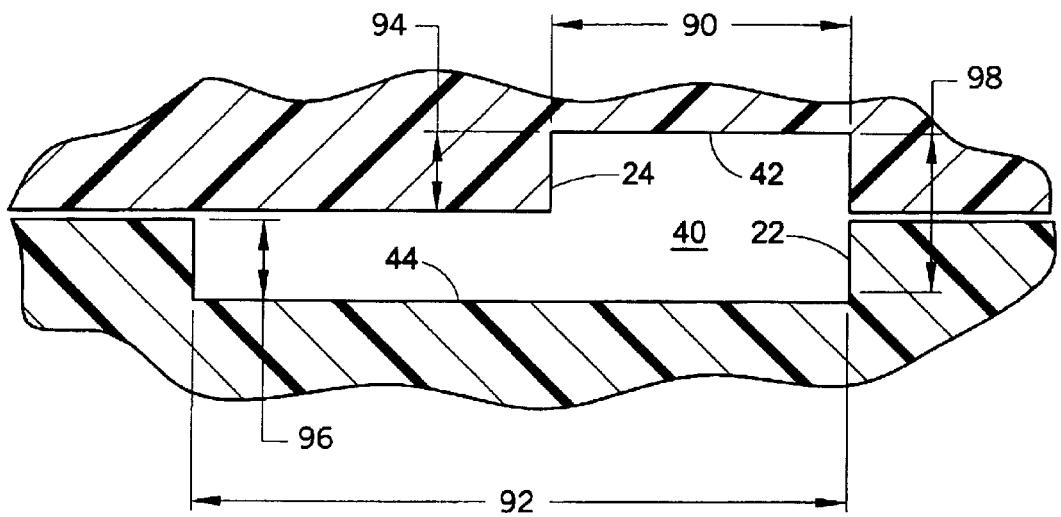
FIG. 8 is a partial cross-sectional elevational view of two circumferential grooves that form a locking strap passage.
Figure 9:
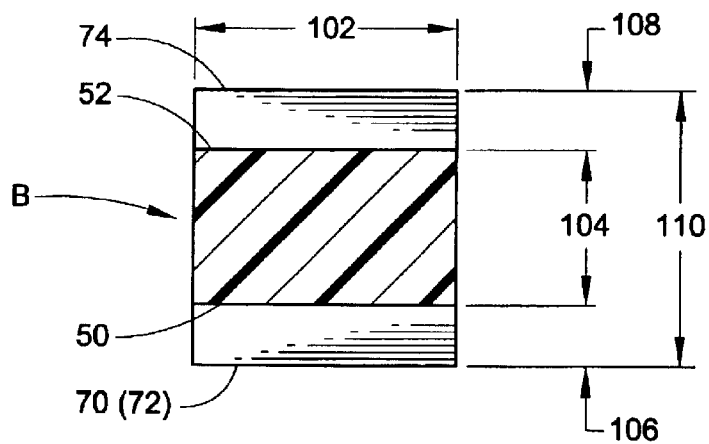
FIG. 9 is a cross-sectional elevational view of the locking strap of FIG. 4 showing the transverse projections thereon.

It will be recognized that the relative dimensions and locations of certain features will vary depending on the pipe size. Examples of typical dimensions are provided with reference to FIGS. 8 and 9 for pipe having a nominal diameter of four inches and an outer diameter of four and one-half inches. The axial width 90 of bell locking strap groove 24 and sealing ring groove 26 in a direction axially of the pipe is 0.300 inch. The axial width 92 of spigot locking strap groove 22 in a direction axially of the pipe is 0.661 inch. Thus, the width of spigot locking strap groove 22 is at least two times the width of bell locking strap groove 24. The depth 94, 96 of each groove radially of the pipe axis is 0.08 inch. Thus, the total depth of locking strap passage 40 between its inner and outer surfaces 42, 44 normally would be 0.16 inch. However, in view of clearance provided between the bell and spigot to facilitate assembly of same, the distance 98 between inner and outer surfaces 42, 44 of locking strap passage 40 is 0.175 inch.

The width 102 of locking strap B is 0.265 inch and the radial thickness 104 thereof between inner and outer surfaces 50, 52 is 0.155 inch. Each triangular projection 70, 72, 74 projects outwardly a distance of 0.06 inch from the surface on which it is located. Thus, the radial thickness of locking strap B when one projection is included is 0.215 inch. The total radial thickness 110 from peak-to-peak of outer projection 74 and inner projections 70, 72 is 0.275 inch. The opposite sides of projections 70, 72, 74 intersect at an included apex angle of 60°. Inner projections 70, 72 are located 15° apart at their peaks, and outer projection 74 is located midway therebetween.

FIG. 7 shows the point 30a where entrance opening 30 enters the locking strap passage. Projection 70 is located within 15–25° of point 30a when the strap is fully received in the passage so that the projections do not provide resistance to insertion of the locking strap until the locking strap is nearly completely received in the locking strap passage. The straight length of locking strap tail portion 62 is 1.45 inches, and end 62a of the straight portion is generally aligned with point 30a of entrance opening 30 when the locking strap is completely within the locking strap passage.

Entrance opening 30 extends generally tangent to the centerline of the locking strap passage. The bending force imparted to tail portion 62 of locking strap B by engagement thereof with the inner and outer locking strap passage surfaces causes the locking strap tail portion 62 to bend inwardly so that locking strap shoulder 66 engages entrance opening abutment 30*b* to prevent inadvertent withdrawal of the locking strap from the locking strap passage.

Transverse projections 70, 72, 74 are crushable and the peaks thereof are flattened out when the locking strap is driven home so that the projections take on the general shape of isosceles trapezoids. Obviously, other projection shapes and locations are also possible. If necessary, head 64 of locking strap B may be gripped with a tool for withdrawing the locking strap from the locking strap passage to separate the joint. Likewise, a screwdriver tip or other tool may be placed beneath head 66 against head underside 64*a* to pry head 64 outwardly to separate locking strap shoulder 66 from entrance opening abutment 30*b* to permit withdrawal of the locking strap from the locking strap passage.

Figure 10:
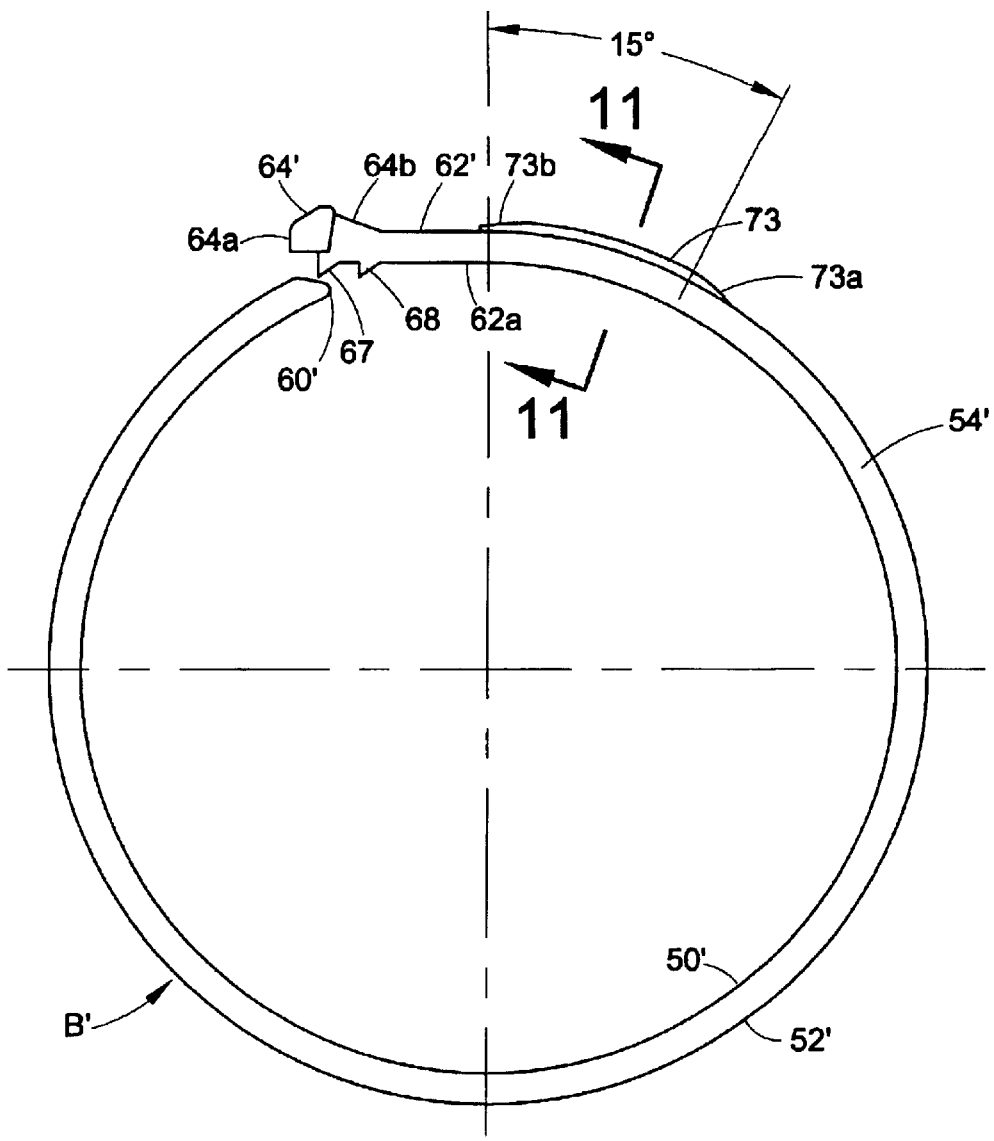
FIG. 10 is a side elevational view of a preferred locking strap in accordance with the present application.
Figure 11:
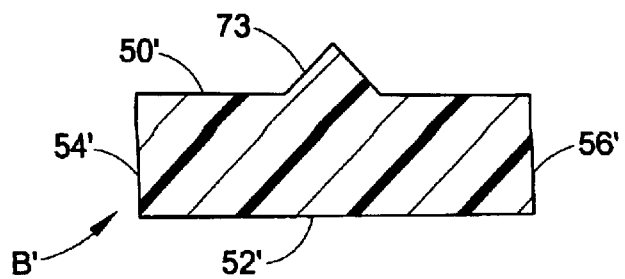
FIG. 11 is a cross-sectional elevational view taken generally on line 11—11 of FIG. 10.
Figure 12:
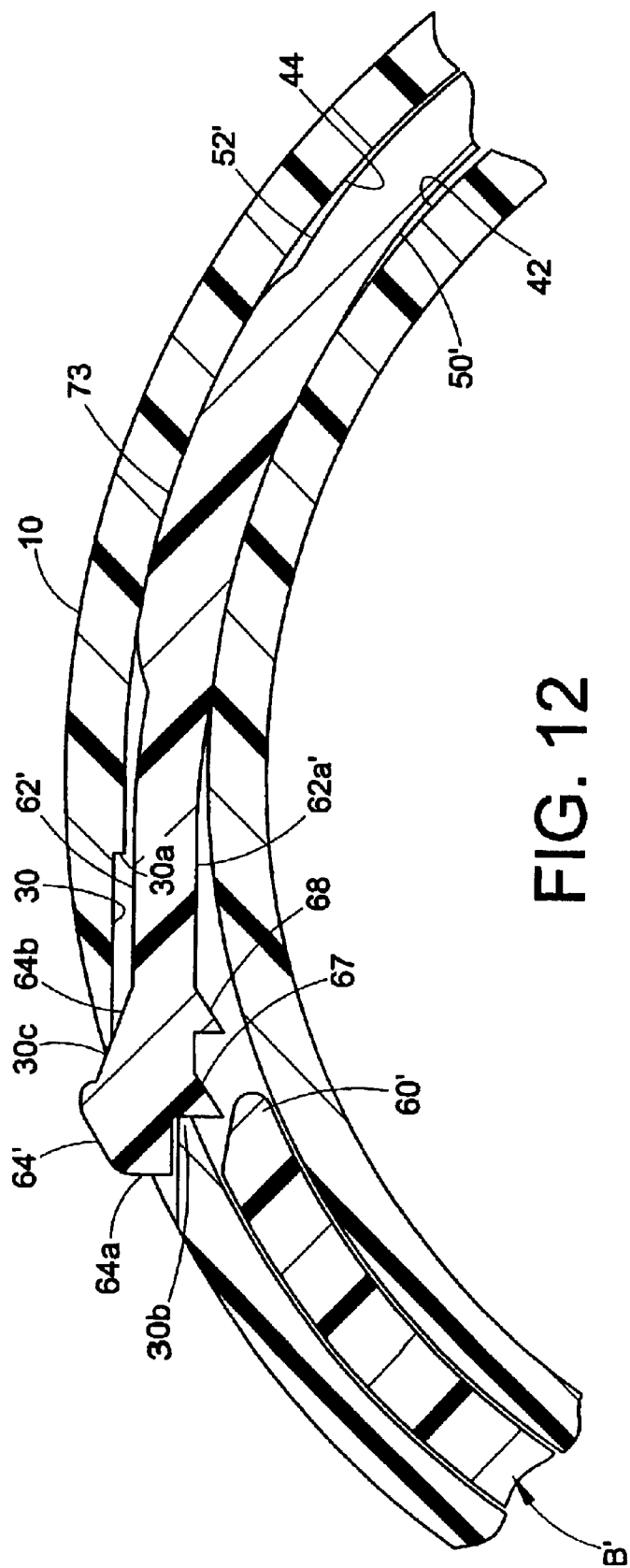
FIG. 12 is a partial enlarged cross-sectional elevational view showing the tail end portion of the locking strap of FIG. 10 received in the locking strap passage of the joint.

FIGS. 10–12 show a preferred locking strap B' having inner and outer surfaces 50', 52' and opposite sides 54', 56'. Locking strap B' has a tapered tip 60' and a tail portion 62' with an enlarged head 64'. Tail portion 62' is straight over an arc of 20–40°, and the locking strap is curved on a circle as shown in FIG. 10 over the remaining 320–340°.

A pair of longitudinally-spaced transverse barbs 67, 68 are provided on the inner surface of the locking strap beneath enlarged head 64', and spaced inwardly from head outer end 64*a*. One of the barbs 67, 68 has its trailing shoulder surface engaging abutment 30*b* at the entrance opening 30 in bell 10 to circumferential groove 24 as shown in FIG. 12.

An elongated projection rib 73 extends longitudinally of locking strap B' on outer surface 52' thereof centered between opposite sides 54', 56'. Rib 73 extends over an arc of around 15° as shown in FIG. 10, and has a generally triangular cross-sectional shape as shown in FIG. 11. The rib is crushable so that the apex of the triangle is flattened when the locking strap is forced into the locking strap passage. Strap surface 50' opposite from rib 73 is pressed into firm frictional engagement with passage surface 42.

Rib 73 has sloping leading and trailing ends 73*a*, 73*b* that gradually slope downwardly to locking strap outer surface 52' from the apex of the rib. Rib trailing end 73*b* is located close to the end point 62*a*' of straight locking strap tail portion 62' so that it will be close to point 30*a* where entrance opening 30 intersects the locking strap passage.

With a bell and spigot assembled as shown in FIG. 2, a split locking ring B' is opened up to begin insertion of tip 60' into opening 30 in bell 10. The locking strap is pushed into locking strap passage 40 until projection 73 engages locking strap passage outer surface 44. A mallet or other suitable tool then may be used to hammer on locking strap head 64' to drive the locking ring completely into the locking ring passage against the resistance provided by engagement between projection rib 73 and the outer passage wall.

Locking strap head 64' has an upper sloping cam surface 64*b* that cooperates with upper edge 30*c* of entrance opening 30 to cam head 64' downwardly as viewed in FIG. 12 to engage one of barbs 67, 68 with abutment 30*b* for locking the strap within the passage against unintentional removal. Cam surface 64*b* slopes outwardly from strap outer surface 52' toward head end 64*a*.

Suitable tools may be used to release the barb from abutment 30*b* and to pull the locking strap from the passage against the frictional resistance provided by crushable rib 73. The barbs have sloping leading cam surfaces to cam past abutment 30*b* when the locking strap is inserted into the locking strap passage. Perpendicular or trailing barb surfaces provide shoulders that cooperate with abutment 30*b* to prevent unintentional withdrawal of the locking strap from the locking strap passage.

The conduit and locking straps of the present application preferably are molded of plastic material. Although the crushable projection rib feature and the abutment/shoulder/barb feature are shown and described on a common locking strap, it will be recognized that the two distinct arrangements for resisting withdrawal of the locking strap may be used individually as alternatives on separate locking straps.

With straight locking strap portion 62' extending over an arc of around 20–40° from head end 64, and rib 73 extending over an arc of around 15°, the rib leading end 73*a* is located within 60° from head end 64. Rib trailing end 73*b* extends past the intersection 62*a* between straight portion 62 and the curved portion of the locking strap. The crushable rib preferably is located between 20–60° from head end 64. This will allow nearly complete insertion of the locking strap into the joint passage before the rib begins to enter the passage.

In the arrangement of the present application, the locking strap is molded of plastic material to have a circumferentially-split circular ring shape as shown in FIGS. 4 and 10. The locking ring has sufficient flexibility to allow it to be opened up to a non-circular shape for inserting the leading end into the passage opening. The entire locking strap can then be threaded into the locking strap passage. It will be recognized that the improved locking features of the present application can be provided on a locking strap that is generally straight as originally molded while having adequate flexibility to conform to the circular shape of the locking strap passage.

Although the invention has been shown and described with reference to representative embodiments, it is obvious that equivalent alterations and modifications will occur to others skilled in the art upon the reading and understanding of this application. Therefore, it is to be understood that the invention may be practiced otherwise than as specifically described herein while remaining within the scope of the claims.

We claim:

1. In a bell and spigot joint, the spigot having an outer circumferential spigot groove aligned with an inner circumferential bell groove, the aligned spigot and bell grooves together forming a locking strap passage to which an entrance opening is provided in the bell, a split locking strap being inserted through the entrance opening into the locking strap passage to prevent separation of the bell and spigot, the locking strap passage having a passage height between inner and outer passage surfaces and the locking strap having a locking strap thickness between inner and outer locking strap surfaces that is less than the passage height, the improvement wherein the locking strap has at least three projections that include a pair of spaced apart projections on one of said inner and outer locking strap surfaces and a single projection located intermediate said pair of projections on the other of said inner and outer locking strap surfaces, each of said projections extending outwardly from said strap surfaces a projection distance, and said locking strap thickness plus said projection distance being greater than said passage height so that said strap in the area of said projection engages said inner and outer passage surfaces to resist displacement of the locking strap from the passage.

2. The joint of claim 1 wherein said pair of projections are spaced-apart between 10–25° and said single projection is centered between said pair of projections.

3. The joint of claim 2 wherein said projections are triangular shaped in a side elevational view of the locking strap.

4. The joint of claim 1 wherein said locking strap is deformed on the opposite side of said projections into firm engagement with said passage inner and outer surfaces.

5. In a bell and spigot joint, the spigot having an outer circumferential spigot groove aligned with an inner circumferential bell groove, the aligned spigot and bell grooves together forming a locking strap passage to which an entrance opening is provided in the bell, a split locking strap being inserted through the entrance opening into the locking strap passage to prevent separation of the bell and spigot, the locking strap passage having a passage height between inner and outer passage surfaces and the locking strap having a locking strap thickness between inner and outer locking strap surfaces that is less than the passage height, the improvement wherein the locking strap has at least one projection on at least one of said inner and outer locking strap surfaces extending outwardly therefrom a projection distance, said locking strap thickness plus said projection distance being greater than said passage height so that said strap in the area of said projection engages said inner and outer passage surfaces to resist displacement of the locking strap from the passage, said locking strap having a trailing end portion with an enlarged head having a head end, said strap being molded of plastic in a circular ring shape to define a locking strap ring, said trailing end portion being straight over an arc of 20–40° from said head end.

6. In a bell and spigot joint, the spigot having an outer circumferential spigot groove aligned with an inner circumferential bell groove, the aligned spigot and bell grooves together forming a locking strap passage to which an entrance opening is provided in the bell, a split locking strap being inserted through the entrance opening into the locking strap groove to prevent separation of the bell and spigot, the entrance opening having an abutment facing toward the locking strap passage and the locking strap having a tail end portion with a shoulder that is engageable with the abutment when the locking strap is fully inserted into the locking strap passage to prevent unintentional displacement of the locking strap from the passage through the entrance opening, said tail end portion of said locking strap having at least two longitudinally-spaced barbs thereon, and said shoulder being on one of said barbs.

7. In a bell and spigot joint, the spigot having an outer circumferential spigot groove aligned with an inner circumferential bell groove, the aligned spigot and bell grooves together forming a locking strap passage to which an entrance opening is provided in the bell, a split locking strap being inserted through the entrance opening into the locking strap groove to prevent separation of the bell and spigot, the entrance opening having an abutment facing toward the locking strap passage and the locking strap having a tail end portion with a shoulder that is engageable with the abutment when the locking strap is fully inserted into the locking strap passage to prevent unintentional displacement of the locking strap from the passage through the entrance opening, said tail end portion of said locking strap including an enlarged head having a head end and said shoulder being on said head, said strap being molded of plastic in a circular ring shape to define a locking strap ring, and said tail end portion being straight over an arc of 20–40° from said head end.

8. In a bell and spigot joint, the spigot having an outer circumferential spigot groove aligned with an inner circumferential bell groove, the aligned spigot and bell grooves together forming a locking strap passage to which an entrance opening is provided in the bell, a split locking strap being inserted through the entrance opening into the locking strap passage to prevent separation of the bell and spigot, the locking strap passage having a passage height between inner and outer passage surfaces and the locking strap having a locking strap thickness between inner and outer locking strap surfaces that is less than the passage height, the improvement wherein the locking strap has at least one projection on at least one of said inner and outer locking strap surfaces extending outwardly therefrom a projection distance, said locking strap thickness plus said projection distance being greater than said passage height so that said strap in the area of said projection engages said inner and outer passage surfaces to resist displacement of the locking strap from the passage, said locking strap having tip and tail ends, said projection being located not greater than 60° from said tail end with said locking strap in a generally circular configuration, and said strap being free of any said projection over the length thereof extending from said tip to a location that is 60° from said tail end.

9. In a bell and spigot joint, the spigot having an outer circumferential spigot groove aligned with an inner circumferential bell groove, the aligned spigot and bell grooves together forming a locking strap passage to which an entrance opening is provided in the bell, a split locking strap being inserted through the entrance opening into the locking strap passage to prevent separation of the bell and spigot, the locking strap passage having a passage height between inner and outer passage surfaces and the locking strap having a locking strap thickness between inner and outer locking strap surfaces that is less than the passage height, the improvement wherein the locking strap has at least one projection on at least one of said inner and outer locking strap surfaces extending outwardly therefrom a projection distance, said locking strap thickness plus said projection distance being greater than said passage height so that said strap in the area of said projection engages said inner and outer passage surfaces to resist displacement of the locking strap from the passage, said strap being molded of plastic material and said projection being a crushable rib having a generally triangular cross-sectional shape.

10. In a bell and spigot joint, the spigot having an outer circumferential spigot groove aligned with an inner circumferential bell groove, the aligned spigot and bell grooves together forming a locking strap passage to which an entrance opening is provided in the bell, a split locking strap being inserted through the entrance opening into the locking strap passage to prevent separation of the bell and spigot, the locking strap passage having a passage height between inner and outer passage surfaces and the locking strap having a locking strap thickness between inner and outer locking strap surfaces that is less than the passage height, the improvement wherein the locking strap has at least one projection on at least one of said inner and outer locking strap surfaces extending outwardly therefrom a projection distance, said locking strap thickness plus said projection distance being greater than said passage height so that said strap in the area of said projection engages said inner and outer passage surfaces to resist displacement of the locking strap from the passage, said projection extending transversely across said locking strap and having a triangular shape with a base on said one locking strap surface and an apex outwardly from said one locking strap surface.

11. In a bell and spigot joint, the spigot having an outer circumferential spigot groove aligned with an inner circumferential bell groove, the aligned spigot and bell grooves together forming a locking strap passage to which an entrance opening is provided in the bell, a split locking strap being inserted through the entrance opening into the locking strap passage to prevent separation of the bell and spigot, the locking strap passage having a passage height between inner and outer passage surfaces and the locking strap having a locking strap thickness between inner and outer locking strap surfaces that is less than the passage height, the improvement wherein the locking strap has at least one projection on at least one of said inner and outer locking strap surfaces extending outwardly therefrom a projection distance, said locking strap thickness plus said projection distance being greater than said passage height so that said strap in the area of said projection engages said inner and outer passage surfaces to resist displacement of the locking strap from the passage, said locking strap being molded of plastic material and said projection having a crushable shape so that said projection is deformably crushed when said strap and projection are inserted into said passage.

12. A circumferentially-split locking strap for insertion into a passage between a bell and spigot in a pipe joint, said strap having a tail end portion with an enlarged head, said head having a shoulder thereon cooperable with an abutment to releasably lock the strap in a passage, said head having a cam surface on the opposite side of said strap from said shoulder for cooperation with an opening edge for the passage to hold said shoulder in engagement with an abutment, at least one crushable projection rib on said locking strap spaced from said head, said locking strap having a tip end portion opposite from said tail end portion, and said locking strap being free of any crushable projections over a major portion of the length thereof from said tip end portion toward said tail end portion.

13. A circumferentially-split locking strap for insertion into a passage between a bell and spigot in a pipe joint, said strap having a tail end portion with an enlarged head, said head having a shoulder thereon cooperable with an abutment to releasably lock the strap in a passage, said head having a cam surface on the opposite side of said strap from said shoulder for cooperation with an opening edge for the passage to hold said shoulder in engagement with an abutment, said strap being molded of plastic in a circular ring shape to define a locking strap ring, said head having a head end, and said locking strap ring being straight over an arc up to 40° from said head end.

14. A circumferentially-split locking strap for insertion into a passage between a bell and spigot in a pipe joint, said strap having a tail end portion with an enlarged head, said head having a shoulder thereon cooperable with an abutment to releasably lock the strap in a passage, said head having a cam surface on the opposite side of said strap from said shoulder for cooperation with an opening edge for the passage to hold said shoulder in engagement with an abutment, said head having a head end and further including a crushable projection rib extending longitudinally of said strap within 60° of said head end, the remainder of said strap beyond 60° from said head end being free of any crushable projection ribs.

15. The locking strap of claim 14 wherein said rib has a generally triangular cross-sectional shape.

16. The locking strap of claim 14 wherein said strap has opposite sides and said rib is centered between said sides.

17. A circumferentially-split locking strap for insertion into a passage between a bell and spigot in a pipe joint, said strap having a tail end portion with an enlarged head, said head having a shoulder thereon cooperable with an abutment to releasably lock the strap in a passage, said head having a cam surface on the opposite side of said strap from said shoulder for cooperation with an opening edge for the passage to hold said shoulder in engagement with an abutment, said locking strap having a tip end portion and further including a plurality of spaced-apart transverse projections on opposite inner and outer surfaces of said strap adjacent said tail end portion, said strap being free of said projections over a major portion of its length from said tip end portion toward said tail end portion.

18. A circumferentially-split locking strap for insertion into a passage between a bell and spigot in a pipe joint, said strap having a tail end portion with an enlarged head, said head having a shoulder thereon cooperable with an abutment to releasably lock the strap in a passage, said head having a cam surface on the opposite side of said strap from said shoulder for cooperation with an opening edge for the passage to hold said shoulder in engagement with an abutment, said strap having inner and outer surfaces, at least one crushable rib projecting from at least one of said surfaces, said rib being within 60° from said head, said strap having a tip end portion, and said strap being free of any said crushable rib from said tip end portion to a location that is 60° from said head.

19. The locking strap of claim 18 wherein said rib is between 40–60° from said head.

* * * * *